UNITED STATES PATENT OFFICE.

CHRISTOPHER JAMES, OF SWANSEA, ENGLAND.

PROCESS OF SMELTING COMPLEX SILVER ORES.

SPECIFICATION forming part of Letters Patent No. 483,962, dated October 4, 1892.

Application filed August 20, 1891. Serial No. 403,229. (No specimens.) Patented in England August 14, 1891, No. 18,740; in France September 20, 1891, No. 216,380, and in Belgium September 28, 1891, No. 96,562.

*To all whom it may concern:*

Be it known that I, CHRISTOPHER JAMES, residing at Swansea, Wales, England, have invented an Improved Process of Smelting Complex Silver Ores, (patented to me in France September 20, 1891, No. 216,380; in Great Britain August 14, 1891, No. 18,740, and in Belgium September 28, 1891, No. 96,562,) of which the following is a specification.

Complex silver ores are often found in association with zinc blende, galena, copper pyrites, and iron pyrites, as well as compounds of antimony and arsenic, the association of zinc offering the greatest difficulty to the metallurgist using the present methods. At the present time the ordinary method of treating these ores is in a cupola-furnace. When these ores do not contain sufficient lead they are technically called "dry." In smelting in the present practice such ores are therefore mixed with litharge (PbO) or agglomerated lead ores, and in extreme cases with metallic lead to bring up the percentage of lead in the mixture to about twenty-five per cent. of the charge. This mixture of lead and silver ore is now as a practice charged in a cupola-furnace with varying proportions of basic iron slag as a flux and smelted. The resulting products consist of metallic lead, copper, matte, and slag, the gold being found chiefly in the lead, while the silver, owing to its great affinity for regulus or matte, is divided between the two products—viz., metallic lead and copper matte, the latter having to be dealt with by subsequent tedious processes for its extraction. When this class of rich ore is smelted in a blast-furnace, as is the practice, large losses are made, the blast carrying fine particles into the flue and finally into the air, and when the ores are rich in zinc and are smelted in a blast-furnace (which is essentially a reducing-furnace) the zinc is reduced at the smelting-zone to metallic zinc. This again combines with the oxygen of the blast and sulphur of the charge and forms zinciferous accretions which grow on the sides of the furnace, so as to impede smelting to a large extent, and should the percentage of zinc in the ore reach fifteen per cent., and as is very often the case twenty-five per cent., the operation of smelting becomes tedious and expensive, owing to the small amount of this class of ore that can be smelted.

Silver ores containing a large percentage of zinc cannot be successfully treated in a blast-furnace as is at present the practice. Again, the necessarily-high temperature required to smelt these complex silver ores in a blast cupola-furnace is attended with a large loss of lead and a corresponding loss of silver.

In my new process I substitute for the cupola-furnace above described (which has a reducing action in the upper part, always preventing the free escape of the oxidized zinc) a reverberatory furnace, which may be worked essentially as an oxidizing one, and from which all volatile matter can readily escape when volatilized.

In the treatment of complex silver ores I crush the ore fine (through a one-eighth-inch mesh) and thoroughly calcine a portion, and ultimately mix this calcined portion with some raw (uncalcined) sulphide either of lead or zinc, or, as is usual, both mixed in such proportion that the oxygen of the calcined part will combine with the sulphur of the raw part to form sulphur dioxide, and the metal or metals will be reduced to a free state as expressed by the equations:

$2ZnO2PbO + ZnSPbS = 3Zn + 3Pb + 2SO2$.

The sulphur escapes as sulphur dioxide. The zinc may be volatilized in the metallic form, in which case it would be immediately oxidized by the air and may be collected by condensation, and the lead collects as a molten bath. My process is therefore especially applicable to such silver ores as contain with lead sulphide zinc blende, which in my process is easily oxidized in the calcined portion, and afterward this oxide assists in effecting the reduction of the sulphides in the uncalcined portion of my mixture, and thus the "blende," which in present methods is a great detriment, becomes to my process of real use.

I regard it not merely as unnecessary but undesirable that a regulus should be formed. Therefore it is essential that the proportion of sulphur should be properly adjusted to the amount of oxygen in the mixture, so as to eliminate the whole of the sulphur as sulphur dioxide. I regard as a characteristic feature of this process that the mixture should be smelted on a bath of lead. The mixture is charged successively and skimmed until the bath of lead is sufficiently enriched, when the lead is drawn off and the operation is repeated.

In applying my improved process, by way of example, to ores such as ore obtained from the Huanchaca mines of Bolivia, (these ores contain in combination with sulphur on an average twenty per cent. zinc, six to ten per cent. lead, two per cent. copper, and from one hundred and fifty to five hundred ounces silver,) as before described, I crush and afterward calcine thoroughly, mixing the calcined ore with a portion of raw. This class of ore contains a large proportion of silica, and in order that not too large a quantity of lead should combine with it I mix a quantity of lime in the mixture. The proportions which I have found to work to advantage are seven parts calcined ore, three parts raw, (uncalcined,) and one part lime. These proportions are ultimately mixed and charged into a reverberating-furnace on a bath of lead in such quantities as experience may dictate.

I have found from one and one-half to two tons to be a most convenient and manageable charge. A good heat is now applied, and in from three to four hours the charge is perfectly fused, and a floating double silicate of lime and lead in the form of slag is found on the lead, (this slag is found to be very poor in silver.) The lead bath having absorbed nearly all the silver, the slag is skimmed off, when the furnace is again charged and skimmed, and so on until the lead has become sufficiently enriched for further treatment, when it is drawn off or loaded into molds.

Having now particularly described my invention, what I claim is—

A process for the treatment of a complex silver-carrying ore containing zinc blende and galena, consisting of finely crushing the ore, calcining approximately two-thirds of the ore to convert the sulphides into oxides, mixing the calcined with the remaining one-third of the raw ore, and smelting the mixture in a reverberatory furnace upon a bath of lead, a reduction being thus effected by the reaction of the sulphides and oxides upon one another to $SO_2$ and reduced metals, of which the lead carries down the silver into the said lead bath, and of the other constituents zinc is volatilized and may be collected, while others collect in a slag which can be removed from the surface of the molten bath.

In testimony whereof I have signed my name to this specification in the presence of two subscribing witnesses.

CHRISTOPHER JAMES.

Witnesses:
   EDWIN GEORGE PRONEUDE,
   BERNARD JOHN MINERS.